(12) United States Patent
Berg et al.

(10) Patent No.: US 6,351,779 B1
(45) Date of Patent: Feb. 26, 2002

(54) EXTENSION LIBRARY TO STANDARD VISA LIBRARY FOR SUPPORT OF COMPLEX I/O FUNCTIONS

(75) Inventors: Nathan Berg, Ft. Collins; Leslie P. Hammer, Loveland; Gregory A Hill, Loveland; Charles Platz, Loveland, all of CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/266,997

(22) Filed: Mar. 12, 1999

(51) Int. Cl.[7] ............................................. G06F 13/00
(52) U.S. Cl. .................................... 710/5; 710/129
(58) Field of Search ........................ 710/100, 101, 710/105, 129, 5; 700/83, 86

(56) References Cited

U.S. PATENT DOCUMENTS 5,771,388 A * 6/1998 Mondrik et al. ............ 710/262
5,847,955 A * 12/1998 Mitchell et al. .............. 700/86

* cited by examiner

Primary Examiner—Glenn A. Auve

(57) ABSTRACT

In an instrumentation system, the functionality of an I/O interface which controls an instrument is extended with an I/O interface extension library. The extension library operates to receive a function call and determines whether the function call is supported by the underlying I/O interface. If the function call is supported by the underlying I/O interface, the function call is passed on to the I/O interface for processing. If the function call is not supported by the underlying I/O interface, the function call is decoded into a sequence of standard I/O primitives that are supported by the underlying I/O interface, which are then sent on to the I/O interface for processing. In one embodiment, reduced overall latency time is achieved by packaging multiple sequential functions into a package and sending the package over an I/O bus to the instrument I/O controller as a single unit rather than sending each sequential function using separate bus instructions.

21 Claims, 4 Drawing Sheets

EXTENSION LIBRARY TO STANDARD VISA LIBRARY FOR SUPPORT OF COMPLEX I/O FUNCTIONS

FIELD OF THE INVENTION

The present invention pertains generally to instrument I/O drivers, and more particularly to a method and system for extending standard virtual instrument software architecture library functionality and reducing the overall latency time of executing multiple functions over an I/O bus.

BACKGROUND OF THE INVENTION

Remote control of instruments has become more widespread due in part to the availability of increased alternatives in high-speed data communication networks, including the proliferation of the internet. It is desirable in many industrial applications to be able to monitor and control instruments from a remote location. The configuration of a remote instrument control setup generally includes a computer system that runs a local instrument monitoring/control program which interfaces, over an I/O bus, with an I/O controller located within or at the instrument itself. Although communication between the computer system and I/O controller may be implemented in numerous ways using a variety of defined data packages, a standardized instrument I/O function library has been developed for the purpose of consistency across the instrumentation industry. This instrumentation standard is known as the VXI Plug&Play Systems Alliance, VPPP-4.3: The VISA Library.

The VISA library provides a number of low-level I/O functions, called primitives, for moving data words or blocks of data words to or from test and measurement instruments. These I/O functions are called by user application programs either directly, or indirectly through instrument drivers. Drivers and user applications that call the VISA I/O operations can be very portable, working on many hardware interfaces as well as different vendors' implementations of the VISA I/O libraries. For example, one vendor's version of VISA can be swapped with another vendor's VISA, yet the instrument drivers and applications do not need to be changed or recompiled. Several versions of VISA have been developed that comply with different I/O bus specifications, such as GPIB, embedded VXI, MXI, GPIB-VXI, IEEE 1394, RS-232, and LAN. VISA functions generate I/O instructions that are interpreted by some type of bus I/O interface (e.g., RS-232, GPIB, VXI controllers). The I/O interface interprets the I/O instructions to control various instruments that are connected to that particular interface.

VXI bus based instrument devices can operate very efficiently when controlled over fast, low-latency interfaces such as embedded VXI or MXI. They operate less efficiently when controlled over slower interfaces such as GPIB or RS-232, or higher-latency interfaces such as LAN or IEEE 1394.

Some VISA functions, including standard peek and poke functions which essentially read from and write to registers in the instrument, are meant to be high performance operations. In some very high speed busses such as embedded VXI, the latency between initiation of a peek or poke function and the completion of the peek or poke function, is very low—on the order of less than 10 microseconds. However, on slow busses such as the IEEE 1394 "Firewire" bus, the bus latency per instruction is more on the order of approximately 150 to 200 microseconds. The high latency of slower busses becomes quite visible when a number of peeks and/or pokes are executed in sequence. For example, the execution of ten sequential peeks and/or pokes results in a latency of approximately 100 microseconds on the embedded VXI versus approximately 1.5 to 2.0 milliseconds using the IEEE 1394 bus. Accordingly, for multiple VISA I/O function calls, it is clear that the bus latency significantly affects the overhead for each function call, thereby significantly increasing the overall time and cost of remote interfacing with the instrument when using a high-latency bus.

Bus latency can be even more problematic. Many applications and instrument drivers depend on certain low-level functions such as peek and poke operations being very fast. In these instances, the use of a high-latency bus may even render the application unusable. For example, often an application must wait on the status of a register bit changing before continuing. The poll of the bit is typically implemented by performing a peek on the register, masking the returned value with a bit mask, and comparing the bit value with a compare value. The poll is repeated, resulting in a sequence of peek function calls, until the bit changes to the bit compare value. If the bit change is used to trigger a time-critical function on the user's end, the return status on the peek commands may not be fast enough to trigger the user's time-critical function, and thus the application cannot work with the underlying I/O bus. Accordingly, a need exists for a method for decreasing the overall latency of executing multiple sequential I/O function calls in a system with a high latency bus.

As described previously, the current VISA library provides only low-level functions. All high-level functions to be performed by an application must be built from each of these low-level functions. For standard high-level functions that are consistently repeated throughout an application or that are used in many different applications, the repeated implementation of these higher-level functions can be quite burdensome in terms of application and/or instrument driver code size and implementation/debug time. One potential implementation would be for each vendor to simply add new functions to their version of the standard VISA library. This is problematic, however, because it requires instrument drivers to check that this particular vendor's standard VISA library is installed and requires it to perform runtime checking—that is, if the vendor's standard VISA library is installed, it makes calls to the extended functions; otherwise it decodes the extended functions into standard VISA primitives and makes calls only to those standard VISA primitives. Accordingly, a need exists for a method for extending the function set of a standard I/O library, such as the standard VISA library, in order to generate higher-level functions at the I/O library level without causing compatibility problems with versions of the standard I/O library that do not support extended functions.

SUMMARY OF THE INVENTION

In accordance with the invention, an extension library is provided which solves the above-mentioned problems. In particular, the extension library provides functions which allow a user application or instrument driver to queue multiple sequential I/O library functions into a single package for transmission across the I/O bus. For I/O libraries that support the extended functions, this allows the overhead due to bus latency to be reduced to that of a single I/O bus instruction. As used herein, the term I/O bus instruction is the set of signals associated with a single I/O function sent across the I/O bus for interpretation by the I/O controller. For example, the set of signals required to instruct the I/O controller to invoke a poke function in the instrument is considered a single I/O bus instruction. As another example, the set of instructions required to perform a block move function (which is used to send a data package) is considered a single I/O bus instruction. Once the multiple function package arrives at the I/O controller over the I/O bus, the controller can perform the queued functions contained in the package very quickly in sequence.

The extension library also allows the primitive standard I/O libraries to be extended to include higher-level functions without affecting the compatibility and portability of user applications and instruction drivers with the underlying standard I/O library. When a call is made to an extended function in the extension library, the extended function detects whether the I/O interface, including the underlying I/O library and I/O controller, supports the extended function. If the underlying I/O interface does support the extended function, the extended function simply passes the extended function call on to the I/O interface, either through the underlying I/O library or directly to the I/O controller. If the underlying I/O interface does not support the extended function, the extended function is decoded into standard I/O library primitives, and the primitive calls are made into the standard I/O library. Thus, the instrument driver vendor can ship its driver with the extension library, and the instrument driver with the extension library will still be compatible with any standard VISA library. Accordingly, the invention allows extended instruction I/O functions to be supported without losing multi-vendor compatibility by adding the extension library.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

The present invention is a novel system and method for reducing the overall latency incurred with multiple sequential I/O operations over high-latency busses and extending the functionality of virtual instrument software architecture without losing compatibility with the underlying VISA library or losing portability of user application and instrument drivers. Although the invention is described in the context of the standardized VISA library, the principles of the invention are equally applicable to any standardized I/O function library that communicates with a remote device over an I/O bus.

Figure 1:
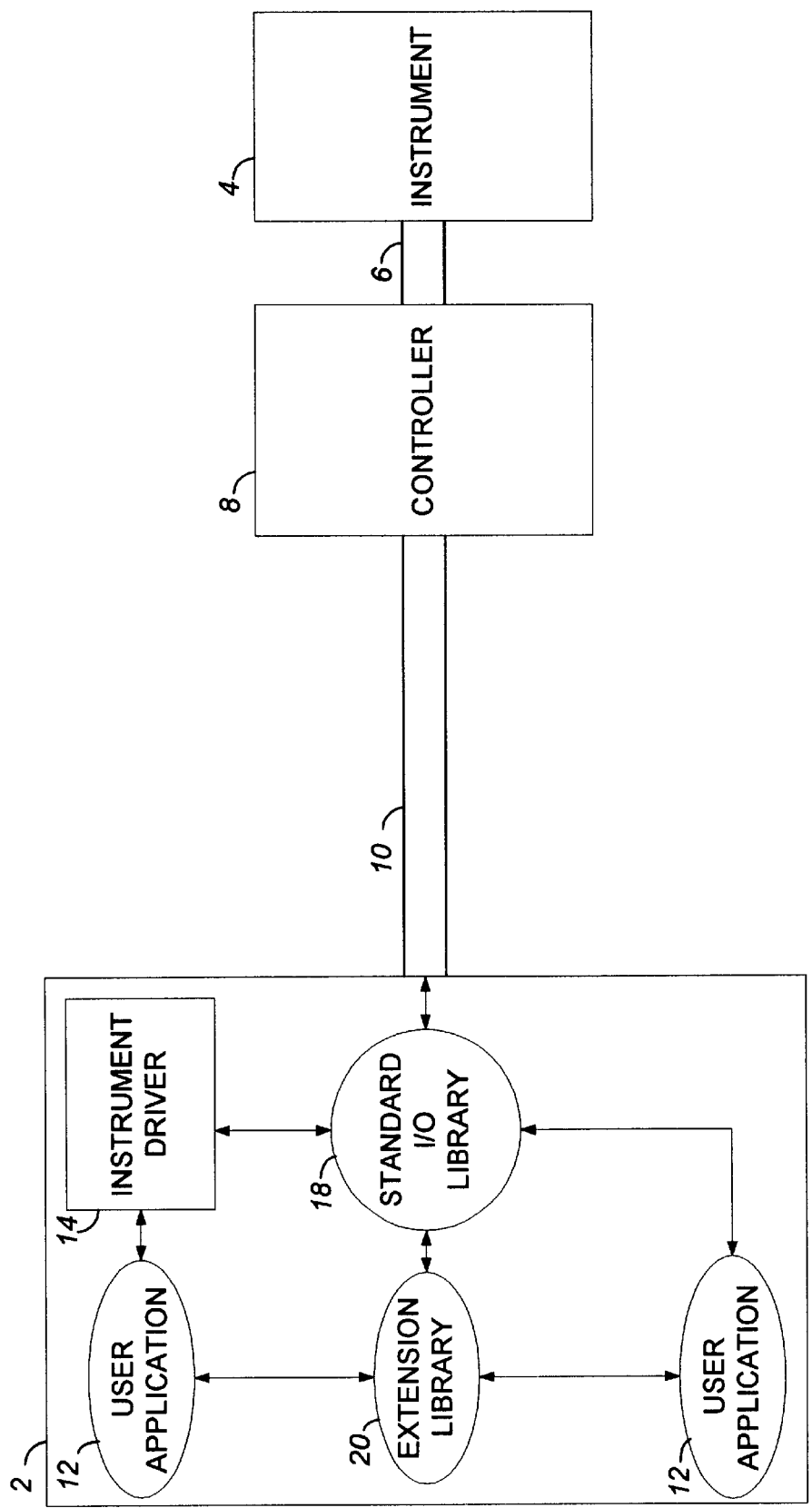
FIG. 1 is a block diagram of a system in which the invention operates.

FIG. 1 is a block diagram of a system in which the invention operates. The system includes a computer 2 coupled via an I/O interface cable 10 to an I/O bus controller 8. Bus controller 8 is coupled to an instrument 4 via an instrument bus 6. Computer 2 executes user applications 12 which communicate directly, or indirectly through an instrument driver 14, with a standardized instrument I/O function library 18 using instrument I/O function calls. As known by those skilled in the art, both user applications 12 and I/O function library 18 are embodied as program instructions that are tangibly stored on a computer readable storage medium. The instrument I/O function library 18 generates bus instructions appropriate to the particular instrument I/O function called and sends them across I/O interface cable 10. Bus controller 8 receives the bus instructions over cable 10, decodes them, and generates instrument signals over instrument bus 6 that are received and processed by instrument 4.

The invention allows execution of complex functions remotely in high-latency interfaces. The invention is embodied in an instrument I/O function extension library 20 that is called by user applications 12 or instrument drivers 14. Instrument I/O function extension library 20 is also embodied in a set of program instructions that are tangibly stored on a computer readable storage medium. An application 12 or instrument driver 14 that utilizes the extension library 20 calls the extension library 20 for complex I/O functions in lieu of the sequence of standard VISA primitives it would otherwise use. The extension library 20 recognizes standard VISA libraries 18 and I/O bus controllers 8 that support the complex functions and passes the functions directly on to these interfaces. For I/O interfaces 18 and 8 that do not support such complex functions, the extension library 20 decodes the complex function into a series of standard VISA primitives and sends those VISA primitives to the interfaces. The complex functions include, but are not limited to, multiple random memory writes and register pokes, multiple random memory reads and memory peeks, register read-mask-writes, and register poll functions. The complex functions may also include, but are not limited to, lists of primitive VISA functions, complex functions, time delays, and programmatic branching. Remote I/O controllers 8 and/or instruments 4 that support these complex functions are capable of decoding the packaged data blocks containing the queued complex functions, performing the functions, and returning response data for the entire package as appropriate.

In accordance with the invention, extension library 20 operates as an interface between user applications 12 and/or instrument drivers 14 and the instrument I/O function library 18 or to the I/O controller 8 directly. In the preferred embodiment, instrument I/O function library 18 is a VISA library complying with the VISA standards, and extension library 20 provides extended VISA functions that are not part of the standardized functions.

Figure 2:
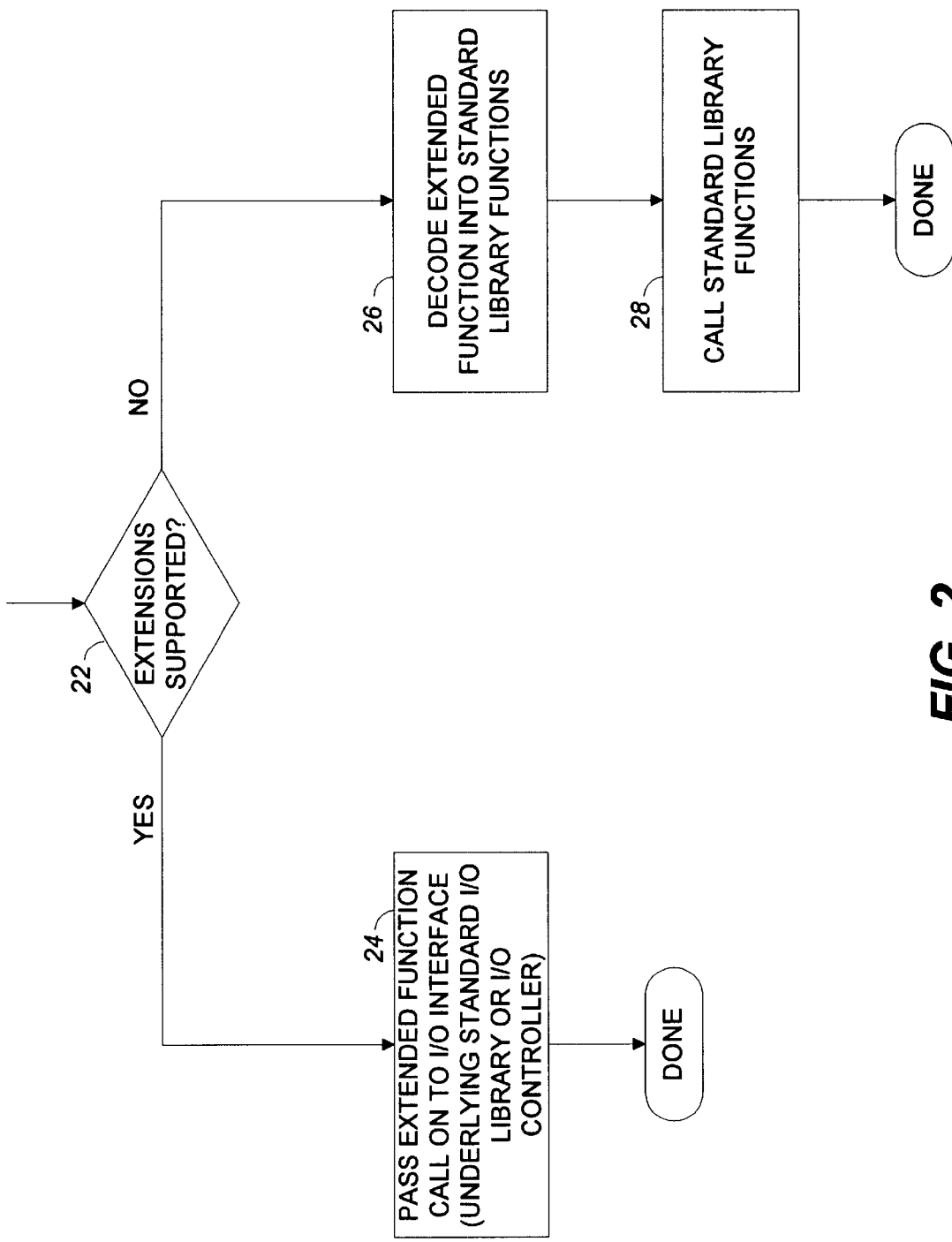
FIG. 2 is an operational flowchart of the general functionality of extension library.

FIG. 2 is an operational flowchart of the general functionality of extension library 20. When an extended function call is made into the extension library 20, the extension library 20 determines 22 whether the extended function is supported by the underlying I/O interface (i.e., the underlying standard I/O library 18 and I/O controller 8). If the extended function is supported, the extended function call is passed on 24 to the underlying I/O interface. If the extended function is not supported, it is decoded 26 into a sequence of standard I/O library primitives that are supported by the underlying I/O interface. The decoded primitives are sent 28 to the underlying interface for processing.

Figure 3:
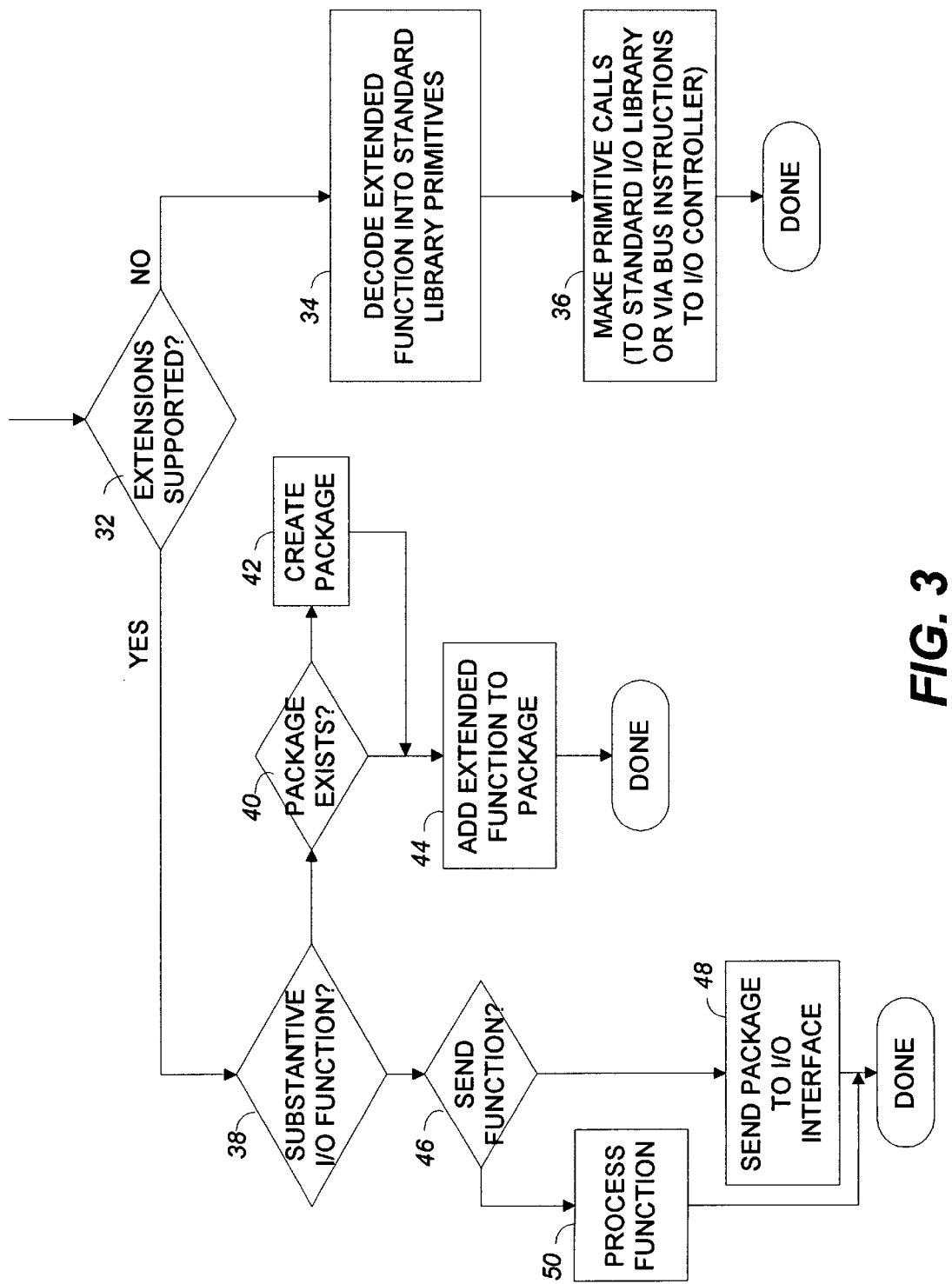
FIG. 3 is an operational flowchart of a more enhanced embodiment of extension library illustrating the method for reducing the overall latency.

FIG. 3 is an operational flowchart of a more enhanced embodiment of extension library 20. In this embodiment, when an extended function call is made into the extension library 20, the extension library 20 determines 32 whether the underlying I/O interface (i.e., underlying standard I/O library 18 and I/O controller 8) supports the extended function. If the interface does not support the extended function, the extended function is decoded 34 into a sequence of standard I/O library primitives that are supported by the underlying I/O interface. The decoded primitives are sent 36 to the underlying interface for processing and the extended function call is complete. If the interface does support the extended function, a determination is made 38 as to whether the extended function is a substantive I/O function. If the extended function is a substantive I/O function, a determination is made 40 as to whether a package has already been created for this function. If a package has not yet been created, it is created 42. The extended function call is added 44 to the package.

If the extended function is not a substantive I/O function, a determination is made 46 as to whether the extended function is a send function. If it is a send function call, the package is sent 48 to the underlying I/O interface. If it is not a send function call, the function gets otherwise processed 50.

Table 1 lists some example functions provided by an example extension library that are callable by user applications 12 and instrument drivers 14.

TABLE 1

| Function Name | Parameters | Description |
|---|---|---|
| viExtBegin | session | Begins a session |
| viExtDelay | uSec | Delays value of uSec |
| viExtPollStatus16 | addrOffset, andMask, cmpValue | Get contents of address offset addrOffset, AND it with andMask, compare result to cmpValue, and repeat if not equal |
| viExtPoke8 | addrOffset, value | set 8-bit register value at address offset to value |
| viExtPoke16 | addrOffset, value | set 16-bit register value at address offset to value |
| viExtPoke32 | addrOffset, value | set 32-bit register value at address offset to value |
| viReadModWrite16 | addrOffset, andMask, orMask | Get contents of address offset, AND it with AND mask, OR result with OR mask, and set contents of address offset to result |
| viExtSendNow | none | Send package |
| viExtEnd | none | Ends the session |

As illustrated, these functions generally include three types of functions—package creation/deallocation functions viExtBegin and viExtEnd, substantive I/O functions that require an action by the instrument 4, and a send function viExtSendNow which handles the sending of a package to the instrument 4.

Appendix A is a header file defining the example extension library functions and API into the standard VISA library 18.

The substantive functions that get appended to a package include viExtDelay( ), viExtPollStatus16( ), viExtPoke8( ), viExtPoke16( ), viExtPoke32( ), and viReadModWrite16( ).

ViExtDelay( ) takes one parameter, uSec, which is the number of microseconds to delay. The delay function is used in some instruments that require a delay after poking a register with a value before the instrument can accept another command.

viExtPollStatus16( ) polls a 16-bit memory location. The poll function reads the value located at a given address offset addrOffset in memory, logically ANDs it with the parameter andMask, and compares it with parameter cmpValue. If the values are equal, the poll function viExtPollStatus completes; if not, the poll function viExtPollStatus repeats the above process until the memory location at addrOffset logically ANDed with andMask is equal to the compare value cmpValue. The poll function viExtPollStatus is used to wait for a bit to become true or false. This function times out if the bit does not go to its expected state within a predetermined timeout time.

ViExtPokexx( ), where xx indicates either an 8-, 16-, or 32-bit memory location, writes a value specified by the value parameter into a memory location specified by parameter addrOffset.

ViExtReadModWrite16( ) reads a memory location specified by parameter addrOffset, logically ANDs it with parameter andMask, then logically ORs the result with parameter orMask, and writes the result into the memory location at addrOffset. In other words, viExtReadModWrite16( ) performs a higher-level complex function which requires several standard VISA function calls to perform.

The viExtSendNow( ) function performs the actual send of a package.

In the illustrative embodiment, if the underlying standard VISA library 18 and controller 8 support the extended functions, extended function calls are sent directly on to the interface 18 and 8. If the underlying standard VISA library 18 and controller 8 do not support the extended functions, the extended functions are decoded into standard VISA primitives and sent in sequence to the I/O interface.

In the preferred embodiment, the package is implemented as an array of function calls. More specifically, the package is defined as a MacroArray as defined in the header file in Appendix A. Each time a substantive extended function is called by an application 12 or instrument driver 14, the extension library 20 simply appends the function call to the command queue in the array if the underlying I/O interface supports the extended function. When a viExtSendNow function call is made, the package is sent to the I/O controller 8 across the I/O cable 6 using a standard block move bus instruction.

Figure 4:
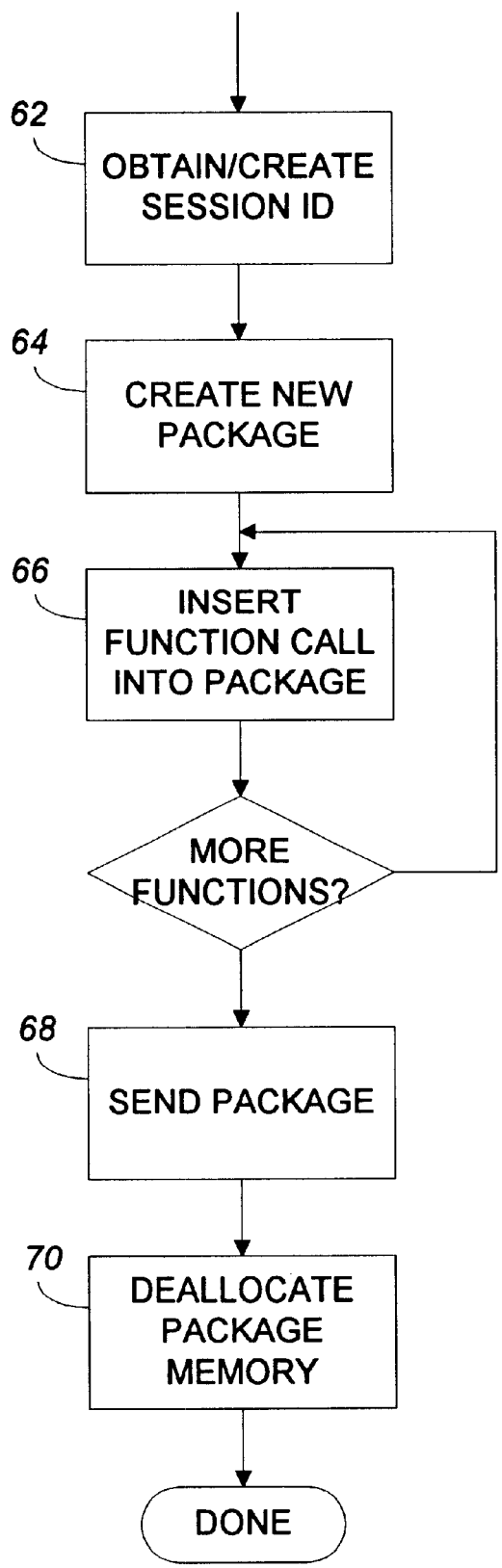
FIG. 4 is a flowchart of a method for a user application or instrument driver for creating an extended function package.

FIG. 4 is a flowchart of a method for a user application 12 or instrument driver 14 for creating an extended function package. A session id is obtained or created 62 if one does not already exist. The viExtBegin( ) function is called 64 on the session id. This step causes a new package to be created. In the illustrative embodiment, the package has the structure of a MacroArray as defined in the example header file of Appendix A. Any number of extended function calls are then made 66 which are inserted sequentially into the package. Once the desired number of extended function calls have been made, the extended function viExtSendNow is called 68 to cause the package to be sent as a single unit (i.e., a single block move instruction) to the I/O device controller 8. Accordingly, the sending of the package incurs a single latency hit rather than a latency hit for each function contained in the package. The viExtEnd function is called 70 to deallocate the package memory and clean up any resources.

It will be appreciated by those familiar with standard I/O function library calls that in the illustrative embodiment, implementation of the user application or instrument driver code is very similar to that of the original code. In other words, aside from the difference in extended function names, the implementation is basically required to enclose extended versions of the original standard VISA functions (named using the extended names) between the viExtBegin function call and a sendNow( ) function call followed by the viExtEnd( ) function call, thus requiring minimal changes A coding example illustrating the way the user would use the extensions is as follows. An example of a very simple standard VISA program is shown below.

viOpen(&vi)

viPoke32(vi, 0x2, 0x27)

.

.

.

viClose(vi).

Function viOpen( ) opens a channel to an instrument 4 and returns a pointer to instrument 4 called a session id. Once the session id "vi" is obtained, any number of commands contained in the standard I/O library 18 can be sent to the instrument 4. In this example, a 32-bit poke of value "0×27" at address "0×2" is performed. When the substantive commands are complete, the session is closed using the close function viClose( ).

To convert this program to use the extended VISA functions, the code as changed to use the extended functions defined in the header file of Appendix A is shown below:

viOpen(&vi)

viExtBegin(vi)

viExtPoke32(vi,0×2, 0×27)

.

.

.

viExtSendNow( )

viExtEnd( )

viExtClose(vi).

A viExtBegin( ) function is creates a package. Substantive I/O functions are inserted in the package (if the underlying I/O interface supports the extended functions). The package is not sent to the I/O interface until a viExtSendNow( ) function is called. The viExtEnd( ) function is called some time after sending the package in order to deallocate the package memory. Other than the additional viExtBegin( ),viExtSendNow( ), and viExtEnd( ) functions, the syntax for calling extended functions is very similar to that of standard VISA function calls.

One of the advantages of the use of an extension library in the present invention is increased portability. If the designer of a user application or an instrument driver wants to use the standard library extensions, the application 12 and/or instrument driver 14 code will call the extended functions from the extension library 20. Since the extension library 20 is a separate dynamic link library, it will work with any standard version of the I/O library 18. The present invention allows the user application 12 or instrument driver 14 to simply make extended I/O function calls and leaves the details concerning whether the underlying standard I/O library 18 and controller 8 support the extended functions to the extension library 20. Thus, the details of whether or not the underlying standard I/O interface supports the extended functions is transparent to the user application 12 or instrument driver 14. Thus, the portability lies in the ability for the underlying standard I/O library 18 to change.

In the embodiment defined by the header file in Appendix A, the extension library 20 determines whether the underlying standard VISA library 18 supports the extended function by performing a Windows function loadLibrary( ) on the standard VISA library. It can then perform a query on the standard I/O library 18 to see if certain functions exist by calling a getProcAddress( ) function with the function name as a parameter.

An alternative method for determining whether an underlying standard I/O library 18 supports an extended function is by user of an attribute maintained in the standard I/O library 18 that indicates whether it supports a given function.

It will be appreciated from the above detailed description that the invention provides several advantages over the prior art. The invention retains the portability of user applications and instrument drivers, while improving system performance for many system configurations.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

APPENDIX A

```
#ifndef _VISAEXT_HEADER_
#define _VISAEXT_HEADER_
#if defined (_cplusplus) || defined (_cplusplus_)
    extern "C" {
#endif
/* Use BeginMacro to give a starting bracket {, allocate the array, and
    record the session handle.
*/
typedef struct {
    ViUInt16     command;
    ViAddr       address;
    ViUInt32     parm1;
    ViUInt32     parm2;
} ViMacroExtElem, *PViMacroExtElem;
#define VI_MACROEXT_DELAY               (0x0001)
#define VI_MACROEXT_POLLSTAT16          (0x0010)
#define VI_MACROEXT_POKE8               (0x0020)
#define VI_MACROEXT_POKE16              (0x0021)
#define VI_MACROEXT_POKE32              (0x0022)
#define VI_MACROEXT_READMODWRITE16      (0x0030)
#define VI_MACROEXT_SESSION             (0xf f f e)
#define VI_MACROEXT_END                 (0xf f f f )
#define MAX_MACRO_ELEMENTS              (16)
#define viMacroExtBegin (session) \
    {\
        ViMacroExtElem macroArray [MAX_MACRO_ELEMENTS + 1];\
        ViUInt32 whereMacroNow = 1; \
        macroArray [0] . command = VI_MACROEXT_SESSION; \
        macroArray [0] . address = 0; \
        macroArray [0] . parm1   = session; \
        macroArray [0] . parm2   = 0;
/* Use these macro-functions to build the array
*/
```

APPENDIX A-continued

```
#define viMacroExtDelay (uSec) \
   (where MacroNow < MAX_MACRO_ELEMENTS) ? \
      macroArray [whereMacroNow] .command = VI_MACROEXT_DELAY, \
      macroArray [whereMacroNow] .address  = 0, \
      macroArray [whereMacroNow] .parm1    = uSec, \
      macroArray [whereMacroNow] .parm2    =0, \
      whereMacroNow++, \
      VI_SUCCESS \
   : \
      VI_ERROR_INV_SETUP;
#define viMacroExtPollStatus16 (addrOffset, andMask, cmpValue) \
   (whereMacroNow < MAX_MACRO_ELEMENTS) ? \
      macroArray [whereMacroNow] .command = VI_MACROEXT_POLLSTAT16, \
      macroArray [whereMacroNow] .address  = addrOffset, \
      macroArray [whereMacroNow] .parm1    = andMask, \
      macroArray [whereMacroNow] .parm2    = cmpValue, \
      whereMacroNow++, \
      VI_SUCCESS \
   : \
      VI_ERROR_INV_SETUP;
#define viMacroExtPoke8 (addrOffset, value) \
   (whereMacroNow < MAX_MACRO_ELEMENTS) ? \
      macroArray [whereMacroNow] .command = VI_MACROEXT_POKE8, \
      macroArray [whereMacroNow] .address  = addrOffset, \
      macroArray [whereMacroNow] .parm1    = value, \
      macroArray [whereMacroNow] .parm2    = 0, \
      whereMacroNow++, \
      VI_SUCCESS \
   : \
      VI_ERROR_INV_SETUP;
#define viMacroExtPoke16 (addrOffset, value) \
   (whereMacroNow < MAX_MACRO_ELEMENTS) ? \
      macroArray [whereMacroNow] .command = VI_MACROEXT_POKE16, \
      macroArray [whereMacroNow] .address  = addrOffset, \
      macroArray [whereMacroNow] .parm1    = value, \
      macroArray [whereMacroNow] .parm2    = 0, \
      whereMacroNow++, \
      VI_SUCCESS \
   : \
      VI_ERROR_INV_SETUP;
#define viMacroExtPoke32 (addrOffset, value) \
   (whereMacroNow < MAX_MACRO_ELEMENTS) \
      macroArray [whereMacroNow] .command = VI_MACROEXT_POKE32, \
      macroArray [whereMacroNow] .address  = addrOffset, \
      macroArray [whereMacroNow] .parm1    = value, \
      macroArray [whereMacroNow] .parm2    = 0, \
      whereMacroNow++ \
      VI_SUCCESS \
   :
      VI_ERROR_INV_SETUP;
#define viMacroExtReadModWrite16 (addrOffset, andMask, orMask) \
   (whereMacroNow < MAX_MACRO_ELEMENTS) ? \
macroArray [whereMacroNow].command=VI_MACROEXT_READMODWRITE16
      macroArray [whereMacroNow] .address = addrOffset, \
      macroArray [whereMacroNow] .parm1 = andMask, \
      macroArray [whereMacroNow] .parm2 = orMask, \
      whereMacroNow++ \
      VI_SUCCESS \
   :
      VI_ERROR_INV_SETUP;
/* Now it's time to go to work.
#define viMacroExtSendNow()\
      viMacroExt (macroArray [0] .parm1, macroArray, where MacroNow);
#define viMacroExtEnd()\
   }
ViStatus_VI_FUNC viMacroExt (ViSession vi, ViMacroExtElem macroArray [], ViUInt3
#if defined (___cplusplus)|| defined (_cplusplus)
}
#endif
#endif // _VISAEXT_HEADER_
```

What is claimed is:

1. A method for extending the functionality of an I/O interface, comprising:

receiving an extended function call;

determining whether said extended function call is supported by said I/O interface;

passing said extended function call on to said I/O interface if said extended function call is supported by said I/O interface; and if said extended function call is not supported by said I/O interface, decoding said extended function call into a sequence of standard I/O primitives that are supported by said I/O interface and sending said sequence of standard I/O primitives to said I/O interface.

2. A method in accordance with claim 1, wherein:
said I/O interface comprises a standard I/O library.

3. A method in accordance with claim 1, wherein:
said I/O interface comprises an I/O controller.

4. A method in accordance with claim 1, wherein said passing step comprises:
inserting said extended function call into a package; and
sending said package upon receipt of a send function call.

5. A method for reducing the overall latency associated with sequentially calling a plurality of substantive I/O functions which are to be processed by an I/O interface to invoke an action by an instrument, said method comprising:
receiving a function call;
determining whether said function call is supported by said I/O interface;
if said function call is not supported by said I/O interface, decoding said function call into a sequence of standard I/O primitives that are supported by said I/O interface and sending said sequence of standard I/O primitives to said I/O interface; and
if said function call is supported by said I/O interface, packaging said function call into a package if said function call is a substantive I/O function, and sending said package to said I/O interface if said function call is a send function.

6. A method in accordance with claim 5, wherein:
said I/O interface comprises a standard I/O library.

7. A method in accordance with claim 6, wherein:
said standard I/O library is responsive to said sending said package by sending said package as a single unit across an I/O bus to an I/O controller using a block move instruction.

8. A method in accordance with claim 5, wherein:
said I/O interface comprises an I/O controller.

9. A system for extending the functionality of an I/O interface, comprising:
an I/O interface which invokes actions in an instrument;
an extension library comprising:
a support determination function which determines whether function call is supported by said I/O interface;
a decoding function which decodes said function call into a sequence of standard I/O primitives that are supported by said I/O interface if said function call is not supported by said I/O interface; and
a send function which sends said sequence of standard I/O primitives to said I/O interface if said function call is not supported by said I/O interface, and which passes said function call on to said I/O interface to invoke an associated action in said instrument if said function call is supported by said I/O interface.

10. A system in accordance with claim 9, wherein:
said I/O interface comprises a standard I/O library.

11. A system in accordance with claim 10, wherein:
said standard I/O library generates at least one I/O bus instruction corresponding to said function call which invokes an associated action in said instrument corresponding to said function call.

12. A system in accordance with claim 11, comprising:
an I/O bus coupled to receive at least one I/O bus instruction; and
an I/O controller coupled to said I/O bus which is responsive to said at least one I/O bus instruction to invoke said associated action corresponding to said function call by said instrument.

13. A system in accordance with claim 9, comprising:
a packaging function which inserts said function call into a package if said I/O interface supports said function call.

14. A system in accordance with claim 13, wherein:
said send function passes said function call on to said I/O interface if said function call is supported by said I/O interface by sending said package containing said function call to said I/O interface.

15. A system in accordance with claim 14, wherein:
said I/O interface comprises a standard I/O library.

16. A system in accordance with claim 15, wherein:
said standard library translates said function call into at least one I/O bus instruction corresponding to said function call which invokes an associated action in said instrument corresponding to said function call.

17. A system in accordance with claim 14, wherein:
said I/O interface comprises an I/O controller.

18. A system in accordance with claim 17, wherein:
said package containing said function call to is sent to said I/O interface using a single I/O bus instruction.

19. A system in accordance with claim 18, wherein:
said I/O controller comprises:
an unpackaging function which is responsive to said at single I/O bus instruction to unpackage each of a sequence of function calls from said package; and
a controller processor which invokes a corresponding action associated with each of said unpackaged function calls in said instrument.

20. A computer readable storage medium tangibly embodying program instructions for performing a method for extending the functionality of an I/O interface, comprising:
receiving an extended function call;
determining whether said extended function call is supported by said I/O interface;
passing said extended function call on to said I/O interface if said extended function call is supported by said I/O interface; and
if said extended function call is not supported by said I/O interface, decoding said extended function call into a sequence of standard I/O primitives that are supported by said I/O interface and sending said sequence of standard I/O primitives to said I/O interface.

21. A computer readable storage medium tangibly embodying program instructions for performing a method for reducing the overall latency associated with sequentially calling a plurality of substantive I/O functions which are to be processed by an I/O interface to invoke an action by an instrument, said method comprising:
receiving a function call;
determining whether said function call is supported by said I/O interface;
if said function call is not supported by said I/O interface, decoding said function call into a sequence of standard I/O primitives that are supported by said I/O interface and sending said sequence of standard I/O primitives to said I/O interface; and
if said function call is supported by said I/O interface, packaging said function call into a package if said function call is a substantive I/O function, and sending said package to said I/O interface if said function call is a send function.

* * * * *